(12) United States Patent
Tets et al.

(10) Patent No.: US 12,480,150 B2
(45) Date of Patent: Nov. 25, 2025

(54) COMPOSITIONS FOR MODULATING GUT MICROBIOTA

(71) Applicants: Viktor Veniaminovich Tets, New York, NY (US); Georgy Viktorovich Tets, New York, NY (US)

(72) Inventors: Viktor Veniaminovich Tets, New York, NY (US); Georgy Viktorovich Tets, New York, NY (US)

(73) Assignee: Viktor Veniaminovich Tets and Georgy Viktorovich TETS, New York, NY (US)

( * ) Notice: Subject to any disclaimer, the term of this patent is extended or adjusted under 35 U.S.C. 154(b) by 741 days.

(21) Appl. No.: 17/256,442

(22) PCT Filed: Jun. 28, 2019

(86) PCT No.: PCT/US2019/039781
§ 371 (c)(1),
(2) Date: Dec. 28, 2020

(87) PCT Pub. No.: WO2020/006389
PCT Pub. Date: Jan. 2, 2020

(65) Prior Publication Data
US 2022/0195491 A1  Jun. 23, 2022

Related U.S. Application Data

(60) Provisional application No. 62/691,933, filed on Jun. 29, 2018.

(51) Int. Cl.
| | |
|---|---|
| *C12Q 1/34* | (2006.01) |
| *A23L 33/15* | (2016.01) |
| *A23L 33/16* | (2016.01) |
| *A61K 33/06* | (2006.01) |
| *A61K 33/14* | (2006.01) |
| *A61P 3/10* | (2006.01) |
| *A61P 25/28* | (2006.01) |
| *A61P 35/00* | (2006.01) |
| *A61P 37/02* | (2006.01) |

(52) U.S. Cl.
CPC ............... *C12Q 1/34* (2013.01); *A23L 33/15* (2016.08); *A23L 33/16* (2016.08); *A61K 33/06* (2013.01); *A61K 33/14* (2013.01); *A61P 3/10* (2018.01); *A61P 25/28* (2018.01); *A61P 35/00* (2018.01); *A61P 37/02* (2018.01); *G01N 2333/922* (2013.01)

(58) Field of Classification Search
None
See application file for complete search history.

(56) References Cited

U.S. PATENT DOCUMENTS

| | | |
|---|---|---|
| 8,871,200 B2 | 10/2014 | Genkin et al. |
| 2005/0281918 A1 | 12/2005 | Shibata et al. |
| 2008/0124801 A1 | 5/2008 | Mee et al. |
| 2017/0000164 A1 | 1/2017 | Marchal et al. |

FOREIGN PATENT DOCUMENTS

| | | | |
|---|---|---|---|
| CN | 101406305 A | 4/2009 | |
| CN | 101574166 A | 11/2009 | |
| DE | 19700368 A1 | 7/1998 | |
| EP | 1005351 | 10/2004 | |
| EP | 1752153 | 2/2007 | |
| RU | 2199924 C2 | 3/2003 | |
| WO | 2005007187 A1 | 1/2005 | |
| WO | WO-2013059881 A1 * | 5/2013 | ............ A23L 33/10 |
| WO | 2016118476 A1 | 7/2016 | |
| WO | 2016190780 A1 | 12/2016 | |
| WO | 2017074211 A1 | 5/2017 | |

OTHER PUBLICATIONS

Gueroult, Marc; et al; "How Cations Can Assist DNase I in DNA Binding and Hydrolysis" PLoS Computational Biology, 6, e1001000, 2010 (Year: 2010).*
Communication (Written Opinion) mailed in International Application No. PCT/US19/39781 mailed Oct. 2, 2019, 9 pages total.
Communication (International Search Report) mailed in International Application No. PCT/US19/39781 mailed Oct. 2, 2019, 3 pages total.
Gueroult, M. et al., "How Cations Can Assist DNase I in DNA Binding and Hydrolysis" PLOS Computational Biology vol. 6, Issue 11, pp. 1-11.
Shack, J. et al., "The Influence of Sodium and Magnesium Ions on the Action of Deoxyribonuclease II" The Journal of Biological Chemistry (1959) vol. 234, No. 11, pp. 3003-3006.
Communication (International Preliminary Report on Patentability) mailed in International Application No. PCT/US19/39781 mailed Dec. 29, 2020, 10 pages total.
Supplementary European Search Report issued Feb. 17, 2022 in connection with EP Application No. 19826878.
Gordana B. et al., "Efficacy and safety of a natural mineral water rich in magnesium and sulphate for bowel function: a double-blind, randomized, placebo-controlled study" European Journal of Nutrition, Steinkopff Verlag, Darmstadt, DE, vol. 56, No. 2, Nov. 10, 2015, pp. 491-499.

* cited by examiner

*Primary Examiner* — David W Berke-Schlessel
(74) *Attorney, Agent, or Firm* — Troutman Pepper Locke LLP

(57) ABSTRACT

The present invention provides compositions that modulate gut microbiota and/or the activity of deoxyribonucleases (e.g., in the gastrointestinal tract) and are useful in the treatment of diseases and disorders related to the activity of deoxyribonucleases including, for example, neurodegenerative, inflammatory, and metabolic diseases and cancer.

6 Claims, No Drawings

COMPOSITIONS FOR MODULATING GUT MICROBIOTA

CROSS-REFERENCE TO RELATED APPLICATIONS

This application is a U.S. National Phase of International Patent Application No. PCT/US2019/039781, filed on Jun. 28, 2019, which published as WO 2020/006389 A1 on Jan. 2, 2020, and claims priority to U.S. Provisional Application Ser. No. 62/691,933, filed on Jun. 29, 2018, the contents of which are incorporated herein by reference in their entireties.

FIELD OF THE INVENTION

The present invention provides compositions that modulate gut microbiota and/or the activity of deoxyribonucleases (e.g., in the gastrointestinal tract) and are useful in the treatment of diseases and disorders related to the activity of deoxyribonucleases including, for example, neurodegenerative, inflammatory, and metabolic diseases and cancer.

BACKGROUND OF THE INVENTION

The microbiota of the human intestinal tract is comprised of bacteria, fungi, and viruses, including bacteriophages. This highly diverse and complex ecosystem is characterized by dynamic stability of each of its components in the context of the host organism. The human gut contains approximately 1013 bacteria, which is greater than ten times of the number of human cells (Dalmasso, M., Hill, C. & Ross, R. Exploiting gut bacteriophages for human health. *Trends Microbiol.* 2014, 22, 399-405).

Prions are molecules characterized by self-propagation, which can undergo a conformational switch leading to the creation of new prions. Prion proteins have originally been associated with the development of mammalian pathologies; however, recently they have been shown to contribute to the environmental adaptation in a variety of prokaryotic and eukaryotic organisms. Prions lead to the misfolding of proteins. Together with the previously demonstrated pathogenic roles of prions during the development of different mammalian diseases, including neurodegenerative disease, prions have recently been shown to represent an important functional component in many prokaryotic and eukaryotic organisms and bacteriophages.

It is known that there are prion proteins capable of acquiring a specific molecule configuration denoted as beta-structure. Prions with a beta structure have special physico-chemical and functional biological characteristics and possess thermal stability. Prions play a role in the emergence of various human and animal diseases. Prion diseases are characterized by one or more symptoms of dementia and/or cognitive impairments, that include, for example, Creutzfeldt-Jakob Disease, variant Creuzfeldt-Jakob Disease, Gerstmann-Straussler-Scheinker disease, fatal familial insomnia, and kuru. Recently, the number of neurodegenerative diseases, such as Alzheimer's disease, Parkinson's disease, CADASIL syndrome and others are also suggested to be associated with prion-like protein misfolding. Simultaneously, there are thermostable proteins that do not have prion-like sequences of amino acids in their structure. Some thermostable proteins are formed under external effects, including proteases. The unique characteristics of prions allow them to actively participate in changing the properties of other proteins, and in some cases, cause severe, incurable diseases of humans and animals.

The previously unknown widespread occurrence of prion-like proteins among animals, humans, bacteria, archaea, fungi and viruses makes their detection relevant for diagnostic purposes, and moreover might be an important approach for the therapy and prevention of various diseases.

Recently, prions and their infectious forms have attracted a lot of research attention (Eisenberg, D. & Mathias, J. The amyloid state of proteins in human diseases. *Cell,* 2012, 148.6, 1188-1203; Morales, R., Keri, C. & Soto, C. Prion-like features of misfolded A3 and tau aggregates. *Virus Research,* 2015, 207, 106-112). The infectious prion forms (PrPSc) represent the misfolded normal proteins (PrPC) and were shown to be infectious, since they can self-propagate and interact with the endogenous PrPC, catalyzing their conversion into pathological PrPScs (Prusiner, S. Biology and Genetics of Prions Causing Neurodegeneration. *Annual Review of Genetics,* 2013, 47, 601-623, Stefani, M. Protein misfolding and aggregation: new examples in medicine and biology of the dark side of the protein world. *Biochimica et Biophysica Acta (BBA) Molecular Basis of Disease,* 2004, 1739, 5-25, Cobb, N. J. & Witold, K. Prion diseases and their biochemical mechanisms. *Biochemistry,* 2009, 48.12, 2574-2585). PrPScs had been primarily known as inducers of transmissible spongiform encephalopathies, however, today they have been shown to be involved in the development of a variety of neurodegenerative diseases (Goedert, M., Clavaguera, F. & Tolnay, M. The propagation of prion-like protein inclusions in neurodegenerative diseases. *Trends in Neurosciences,* 2010, 33, 317-325; Furukawa, Y. & Nukina, N. Functional diversity of protein fibrillar aggregates from physiology to RNA granules to neurodegenerative diseases. *Biochimica et Biophysica Acta (BBA)—Molecular Basis of Disease,* 2013, 1832, 1271-1278.

Intestinal barrier dysfunction or disruption, known as "leaky gut" syndrome, is characterized by the translocation of macromolecules, bacteria or their toxins to the lamina propria, which is implicated in the pathogenesis of numerous diseases (Maes, M., Kubera, M., Leunis, J. & Berk, M. Increased IgA and IgM responses against gut commensals in chronic depression: Further evidence for increased bacterial translocation or leaky gut. *J. Affect. Dis.* 2012, 141, 55-62). Abnormally permeable mucosal barrier is associated with various pathologies including inflammatory bowel disease, Crohn's disease, neurodegenerative diseases, diabetes type 1, some types of cancers, cardiovascular disorders, rheumatoid arthritis, etc. (Rhee, S., Pothoulakis, C. & Mayer, E. Principles and clinical implications of the brain-gut-enteric microbiota axis. *Nat. Rev. Gastroenterol. Hepatol.,* 2009, 6, 306-314; Bischoff, S. et al. Intestinal permeability—a new target for disease prevention and therapy. *BMC Gastroenterol.,* 2014, 14); Vaarala, O., Atkinson, M. & Neu, J. The "Perfect Storm" for Type 1 Diabetes: The Complex Interplay Between Intestinal Microbiota, Gut Permeability, and Mucosal Immunity. *Diabetes,* 2008, 57, 2555-2562. The altered microbiota composition and dysfunctional intestinal barrier have emerged as potential triggers of the growing incidence of chronic diseases (Natividad, J. & Verdu, E. Modulation of intestinal barrier by intestinal microbiota: Pathological and therapeutic implications. *Pharmacol. Res.,* 2013, 69, 42-51).

Bacteria in human gut live within surface-associated microbial communities named biofilms which are characterized by the presence of self-produced extracellular matrix (ECM) and surface film that protect microorganisms for the outer environment (Costerton, J. W., Stewart, P. S., &

Greenberg, E. P. (1999). Bacterial biofilms: a common cause of persistent infections. *Science*, 284(5418), 1318-1322). ECM consists of different biomolecules including extracellular nucleic acids, polysaccharides and proteins, and several microorganisms within human microbiome predominantly among the members of Enterobacteriaceae family possess amyloid proteins that can form so called curli fibers within ECM as well that provide them with unique mechanical properties and representing an important step during biofilm formation (Barnhart, M. M., & Chapman, M. R. (2006). Curli biogenesis and function. *Annu. Rev. Microbiol.*, 60, 131-147.].

Bacterial amyloid form highly ordered cross-beta amyloid β-sheets composed of the major subunit of the fibril, CsgA and a minor subunit, CsgB. CsgA and CsgB are co-secreted across the plasma membrane. CsgB nucleates and attaches CsgA to the surface of bacterial cell. In turn, soluble CsgA polymerizes with the cell surface bound CsgA, forming the core of the amyloid β-sheet secondary structure. Bacteria amyloid can also form complexes with DNA forming "curli" (Schwartz, K., Ganesan, M., Payne, D. E., Solomon, M. J., & Boles, B. R. (2016). Extracellular DNA facilitates the formation of functional amyloids in *Staphylococcus aureus* biofilms. Molecular microbiology, 99(1), 123-134.). Extracellular DNA (eDNA) play important role in beta amyloid formation (Schwartz, K., Ganesan, M., Payne, D. E., Solomon, M. J., & Boles, B. R. (2016). Extracellular DNA facilitates the formation of functional amyloids in *Staphylococcus aureus* biofilms. *Molecular Microbiology*, 99(1), 123-134). The level of free eDNA in the intestinal is under the Deoxyribonuclease I (DNase I) control.

Deoxyribonuclease I (DNase I: EC.3.1.21.1), an endonuclease preferentially degrading double-stranded DNA, was first considered to be an exocrine pancreatic enzyme but was later found to be localized in a number of other tissues (Laskowski Sr, M. (1971). 12 Deoxyribonuclease I. In The enzymes (Vol. 4, pp. 289-311). Academic Press).

The optimal pH of this enzyme is neutral, and $Ca^{2+}$ and $Mg^{2+}$ are important cofactors of enzymatic activity (Laskowski Sr, M. (1971). 12 Deoxyribonuclease I. In The enzymes (Vol. 4, pp. 289-311). Academic Press). DNase 1 in the gut is produced and Panet cells are isolated (Biochem. JMarkus NAPIREI1, Albert RICKEN, Dirk EULITZ, Heiko KNOOP and Hans Georg MANNHERZ Expression pattern of the deoxyribonuclease 1 gene: lessons from the Dnase1 knockout mouse. (2004) 380, 929-937); Shimada, O., Ishikawa, H., Tosaka-Shimada, H., Yasuda, T., Kishi, K., & Suzuki, S. (1998). Detection of deoxyribonuclease I along the secretory pathway in Paneth cells of human small intestine. *Journal of Histochemistry & Cytochemistry*, 46(7), 833-840). The main target of DNase secreted by intestinal cells is extracellular DNA. Such DNA is contained in biofilms of various bacteria, performs various functions, including participates in the formation of beta-amyloid (Kelly Schwartz, Mahesh Ganesan, David E. Payne, Michael J. Solomon, and Blaise R. Boles Extracellular DNA facilitates the formation of functional amyloids in *Staphylococcus aureus* biofilms *Mol Microbiol.* 2016; 99 (1): 123-134; Jerson L. Silva and Yraima Cordeiro The "Jekyll and Hyde" Actions of Nucleic Acids on the Prion-like Aggregation of Proteins, J. Biol. Chem., 2016, 291(30): 15482-15490). By providing Mg, destroying extracellular DNA when forming biofilms VDP reduces the amount of bacterial beta Amyloid. Beta Amyloid has a toxic effect and disrupts the various functions of the central nervous system, cells of various organs, and thus affect appetite and metabolic processes (Charles G. Glabe, PhD; and Rakez Kayed Common structure and toxic function of amyloid oligomers is the common mechanism of pathogenesis *Neurology* 2006; 66; S74 Katarzyna Lundmark, Gunilla T. Westermark, Arne Olse'n, and Per Westermark Protein fibrils in nature can enhance amyloid protein A amyloidosis in mice: Cross-seeding as a disease mechanism 2005, *PNAS* 102 6098-6102).

Accordingly, new or improved compositions are needed which modulate DNase activity and, in turn, treat associated diseases. The compositions and methods described herein are directed towards these and other ends.

SUMMARY OF THE INVENTION

The present invention provides, inter alia, products and/or compositions comprising certain cations such as magnesium and/or sodium that are useful for modulating deoxyribonuclease (DNase) activity. The compositions may comprise, e.g., about 6.0 to 155.0 mg/l $Mg^{2+}$ (e.g., about 100 mg/l or about 140.0 mg/l $Mg^{2+}$), about 0.005 to 12 mg/l $Na^+$ (e.g., about 0.1, or 0.5 or about 2.0 mg/l $Na^+$); and water. Certain additives may be added to the compositions, such as, ascorbic acid; B vitamins; extracts or infusions of green tea; aloe; garcinia; gentiana; corn silk; turmeric; grapefruit; or citric acid. The sodium cations in the compositions can be derived from sodium bicarbonate or sodium sulfate. The magnesium cations in the compositions can be derived from magnesium chloride or magnesium oxide. Further, citric acid and/or succinic acid can be used to increase the solubility of magnesium oxide. In some embodiments, the water composition of the invention is essentially free of any cation other than sodium and magnesium cations. In some embodiments, the water composition comprises about 6.0 to 15.0 mg/l $Mg^{2+}$; about 12 mg/l $Na^+$; and water. The water in the composition can be very low mineral content water or light mineral water (e.g., having a mineral concentration of less than 50 mg/l) or demineralized water or distilled water.

The present invention further provides a method of modulating (e.g., increasing) the activity of a DNase (e.g., deoxyribonuclease I or deoxyribonuclease II) by contacting the DNase with a water composition of the invention. The present invention further provides a method of modulating activity of a DNase in a subject, comprising administering to the subject a water composition of the invention. The modulating may be used to increase DNase activity in the gastrointestinal tract of the subject.

The present invention further provides a method of treating a disease or disorder associated with DNase activity in a subject in need thereof comprising administering to the subject the water composition of the invention. The disease or disorder can include neurodegenerative disorders, diabetes (e.g., type 1 diabetes), cancer, graft versus host disease, systemic lupus erythematosus, metabolic syndrome, weight gain and obesity. When used to treat cancer, the inventive compositions may be used to help maintain the condition of patients undergoing chemotherapy or those patients undergoing X-ray therapy. Neurodegenerative diseases and disorders that may be treated include such diseases as Alzheimer's disease, Parkinson's disease, dementia and CADASIL syndrome. In certain embodiments, the disease or disorder is an enteric viral disease, a bacteriophage disorder or a metabolic syndrome. The inventive compositions may be administered (e.g., as 200 mL aliquots), e.g., three times a day for at least one week.

DETAILED DESCRIPTION

This invention provides water compositions that are highly effective for modulating the activity of the deoxyribonuclease (DNase) family of enzymes. In particular, this invention provides products for maintenance of DNase activity, that contain $Mg^{2+}$ and $Na^+$ cations and water, while other cations are either absent or in mass with other chemical components of water by mass less than 50 mg/l.

The $Mg^{2+}$ can be derived from any suitable magnesium source known to those of ordinary skill, such as magnesium chloride or magnesium oxide. Further, citric acid and/or succinic acid can be used to increase the solubility of magnesium oxide. Suitable concentrations of magnesium cation include, but are not limited to, e.g., about 5.0, 6.0, 7.0, 8.0, 9.0, 10.0, 20.0, 30.0, 40.0, 50.0, 60.0, 70.0, 80.0, 90.0, 100.0, 110.0, 120.0, 130.0, 140.0, 150.0 or about 155.0 mg/l $Mg^{2+}$, or about 6.0 to about 15.0 mg/l $Mg^{2+}$, or about 140.0 mg/l $Mg^{2+}$.

The $Na^+$ can be derived from any suitable sodium source known to those of ordinary skill in the art, such as sodium bicarbonate or sodium sulfate. Suitable concentrations of sodium include, but are not limited to, e.g., about 0.001, 0.002, 0.003, 0.004, 0.005, 0.006, 0.007, 0.008, 0.009, 0.01, 0.02, 0.03, 0.04, 0.05, 0.1, 0.5, 1.0, 2.0, 3.0, 4.0, 5.0, 6.0, 7.0, 8.0, 9.0, 10.0, 11.0, or about 12 mg/l $Na^+$, or about 0.1 or about 0.5 or about 2.0 mg/l $Na^+$.

In some embodiments, the water composition comprises: about 6.0 to 15.0 mg/l $Mg^{2+}$, about 12 mg/l $Na^+$; and water.

In some embodiments of the invention, the composition is essentially free of any cation other than sodium and magnesium cations. In some embodiments, the composition comprises only sodium and magnesium cations in water and no other components.

In some embodiments of the invention, the water composition consisting essentially of: (i) about 6.0 to 155.0 mg/l $Mg^{2+}$; (ii) about 0.005 to 12 mg/l $Na^+$; and (iii) water, such that there are no additional components added to the composition which materially affect the basic and novel characteristics of the invention.

In some embodiments of the invention, the water composition consists of (i) about 6.0 to 155.0 mg/l $Mg^{2+}$; (ii) about 0.005 to 12 mg/l $Na^+$; and water, such that no other components are added to the composition.

In some embodiments, the water composition is provided at room temperature. The water compositions may further comprise an additive selected from ascorbic acid; B vitamins; extracts or infusions of green tea; aloe; garcinia; gentiana; corn silk; turmeric; grapefruit; and citric acid.

The water used in the compositions may include certain forms of water such as very low mineral content water (or light mineral water) having a mineral concentration of less than 50 mg/l. Demineralized water and distilled water may also be used.

Without being bound by any particular theory of the invention, Applicants believe that the composition of the invention modulates DNase activity and, in turn: (i) prevents the formation of DNA protein complexes in the microbiota, (ii) promotes the maintenance of barrier functions of the gut (iii) reduces the penetration of bacteria, bacteriophages, microbial toxins and matrix components into the systemic bloodstream, (iv) inhibits the development of neurodegenerative and oncological diseases, diabetes, metabolic syndrome, (v) helps to reduce excess body weight, and (vi) improves the condition of patients subjected to with chemotherapy and X-ray therapy.

Methods

Compositions of the invention can modulate activity of one or more deoxyribonucleases (DNases). The term "modulate" is meant to refer to an ability to increase or decrease the activity of one or more members of the DNase family of enzymes. Accordingly, compositions of the invention can be used in methods of modulating a DNase by contacting the DNase with any one or more of the compositions described herein. In some embodiments, compositions of the present invention can act as inhibitors of one or more DNases. In some embodiments, compositions of the present invention can act to stimulate the activity of one or more DNases. In further embodiments, the compositions of the invention can be used to modulate activity of a DNase in an individual in need of modulation of the enzyme by administering a modulating amount of a composition of the invention.

DNases to which the present compositions interact with and/or modulate include any member of the DNase family, in particular the Mg-dependent DNase family. In some embodiments, the DNase is deoxyribonuclease I.

Another aspect of the present invention pertains to methods of treating a DNase-associated disease or disorder in an individual (e.g., patient) by administering to the individual in need of such treatment a therapeutically effective amount or dose of a composition of the present invention. A DNase-associated disease can include any disease, disorder or condition that is directly or indirectly linked to expression or activity of the DNase, including overexpression and/or abnormal activity levels. A DNase-associated disease can also include any disease, disorder or condition that can be prevented, ameliorated, or cured by modulating DNase activity.

Examples of DNase-associated diseases include diseases involving the immune system including, for example, organ transplant rejection (e.g., allograft rejection and graft versus host disease). Further examples of DNase-associated diseases include autoimmune diseases such as multiple sclerosis, rheumatoid arthritis, juvenile arthritis, diabetes (e.g., type I diabetes), lupus, psoriasis, inflammatory bowel disease, ulcerative colitis, Crohn's disease, or autoimmune thyroid disorders. Further examples of DNase-associated diseases include allergic conditions such as asthma, food allergies, atopic dermatitis and rhinitis. Further examples of DNase-associated diseases include viral diseases such as Epstein Barr Virus (EBV)$_5$ Hepatitis B, Hepatitis C$_5$ HIV$_5$ HTLV I$_5$ Varicella-Zoster Virus (VZV) and Human Papilloma Virus (HPV). Further examples of DNase-associated diseases or conditions include skin disorders such as atopic dermatitis, psoriasis (for example, psoriasis vulgaris), skin sensitization, and the like. In further embodiments, the DNase-associated disease is cancer such as, for example, prostate, renal, hepatocellular, pancreatic, gastric, breast, lung, cancers of the head and neck, glioblastoma, leukemia, lymphoma or multiple myeloma.

In some embodiments, the disease or disorder is a neurodegenerative disorder, such as Alzheimer's disease, Parkinson's disease, dementia, or CADASIL syndrome. In some embodiments, the disease or disorder is diabetes, such as type 1 diabetes. In some embodiments, the disease or disorder is cancer. The cancer treatment may involve maintaining the condition of patients undergoing chemotherapy or X-ray therapy.

In some embodiments, the disease or disorder is graft versus host disease.

In some embodiments, the disease or disorder is systemic lupus erythematosus.

In some embodiments, the disease or disorder is metabolic syndrome.

In some embodiments the disease or disorder is weight gain.

In some embodiments, the disease or disorder is obesity.

In some embodiments, the disease or disorder is an enteric viral disease.

In some embodiments, the disease or disorder is a bacteriophage disorder.

In some embodiments, the disease or disorder is a metabolic syndrome.

In some embodiments, the enteric viral disease involves, for example, an infection caused by Hepatitis A virus, Norovirus, Rotavirus, Hepatitis E virus, Astrovirus, Reovirus, or Echovirus.

In some embodiments, the metabolic syndrome includes, for example, conditions such as obesity, fatty liver, diabetes, hyperlipidemia, hypertension, hypercholesterolemia, hyper low-density lipoprotein (LDL) cholesterinosis, cardiovascular disease, arteriosclerosis, and coronary artery disease.

As used herein, the term "contacting" refers to the bringing together of indicated moieties in an in vitro system or an in vivo system. For example, "contacting" a DNase with a composition of the invention includes the administration of a composition of the present invention to an individual or patient, such as a human, having a DNase, as well as, for example, introducing a composition of the invention into a sample containing a cellular or purified preparation containing the DNase.

As used herein, the term "subject" or "individual" or "patient," used interchangeably, refers to any animal, including mammals, preferably mice, rats, other rodents, rabbits, dogs, cats, swine, cattle, sheep, horses, or primates, and most preferably humans.

As used herein, the phrase "therapeutically effective amount" refers to the amount of active composition or pharmaceutical agent that elicits the biological or medicinal response in a tissue, system, animal, individual or human that is being sought by a researcher, veterinarian, medical doctor or other clinician, which includes one or more of the following:

(1) preventing the disease; for example, preventing a disease, condition or disorder in an individual who may be predisposed to the disease, condition or disorder but does not yet experience or display the pathology or symptomatology of the disease; (2) inhibiting the disease; for example, inhibiting a disease, condition or disorder in an individual who is experiencing or displaying the pathology or symptomatology of the disease, condition or disorder (i.e., arresting further development of the pathology and/or symptomatology), and (3) ameliorating the disease; for example, ameliorating a disease, condition or disorder in an individual who is experiencing or displaying the pathology or symptomatology of the disease, condition or disorder (i.e., reversing the pathology and/or symptomatology).

One or more additional pharmaceutical agents such as, for example, chemotherapeutics, anti-inflammatory agents, and/or immunosuppressants can be used in combination with the compositions of the present invention for treatment of DNase-associated diseases, disorders or conditions. For example, the inventive composition may be used in combination with a chemotherapeutic in the treatment of colorectal cancer (or some other form of cancer) may improve the treatment response as compared to the response to the chemotherapeutic agent alone, without exacerbation of its toxic effects. Additive or synergistic effects are desirable outcomes of combining a composition of the present invention with an additional agent. The agents can be combined with the present compositions in a single or continuous dosage form, or the agents can be administered simultaneously or sequentially as separate dosage forms.

Kits

The present invention also includes pharmaceutical kits useful, for example, in the treatment or prevention of DNase-associated diseases or disorders, such as cancer, which include one or more containers containing a solution comprising a therapeutically effective amount of a composition described herein. Such kits can further include, if desired, one or more of various conventional pharmaceutical kit components, such as, for example, containers with one or more pharmaceutically acceptable carriers, additional containers, etc., as will be readily apparent to those skilled in the art. Instructions, either as inserts or as labels, indicating quantities of the components to be administered, guidelines for administration, and/or guidelines for mixing the components, can also be included in the kit.

The invention can be described and demonstrated by way of specific examples. The following examples are offered for illustrative purposes and are not intended to limit the invention in any manner. Those of skill in the art will readily recognize a variety of noncritical parameters which can be changed or modified to yield essentially the same results.

EXAMPLES

Reagents and solvents are obtained from commercial sources such as Sigma-Aldrich.

Example 1

This example describes the preparation of a product of the present invention that is useful for the maintenance of DNase activity. To a sample of very low mineral content water (light mineral water; demineralized water or distilled water may also be used) was added $Mg^{2+}$ (in the form of magnesium chloride or magnesium oxide) and $Na^+$ (in the form of sodium bicarbonate or sodium sulfate) to a final concentration of 7.0-155.0 mg/l, and 0.005-12.0 mg/l, respectively. The pH of the water composition was adjusted to a final pH of 6.0 to 7.5.

| Reagent | Amount |
| --- | --- |
| $Mg^{2+}$ ($MgCl_2$) | 7.0-155.0 mg/l |
| $Na^+$ ($NaHCO_3$) | 0.005-12.0 mg/l |
| Water | Balance |

Example 2

This example describes a method for determining DNase activity in Alzheimer's disease patients.

In this experiment, five patients (male), aged 72±2 years, with Alzheimer's disease were studied. To each patient was administered a water composition of the invention having the following constitution:

| Reagent | Amount |
| --- | --- |
| $Mg^{2+}$ (MgO) | 100.0 mg/l |
| $Na^+$ ($Na_2SO_4$) | 2.00 mg/l |
| Demineralized water | Balance |

The composition (200 mL) was administered to each patient three times a day for one week. During this experiment, fecal samples were collected from each patient using a sterile collection tube. The samples (10 mg feces) were diluted in phosphate buffered saline (PBS) (0.02 mol/L, pH 7.2-7.4)

(100 µl PBS). Samples were fully shaken and then left standing for 10 minutes. The samples were then centrifuged for approximately 20 minutes at 3000 rpm. The supernatants from each sample were collected and either assayed immediately or stored at −80° C. DNase activity was determined using standard colorimetric methods (Sinicropi, D., Baker, D. L., Prince, W. S., Shiffer, K., Shak, S., *Analytical Biochemistry*, "Colorimetric Determination of DNase I Activity with a DNA Methyl Green Substrate," Volume 222, Issue 2, 1 Nov. 1994, Pages 351-358). The data from this experiment is shown in Table 1.

TABLE 1

DNase Activity in Alzheimer's Disease Patients.

| Patient | DNase activity Before | One week later |
|---|---|---|
| 1 | ND* | 0.15 |
| 2 | ND | 0.20 |
| 3 | 0.100 | 0.20 |
| 4 | ND | 0.1 |
| 5 | ND | 0.25 |

*ND = not detected

Example 3

This example describes a method for determining DNase activity in patients that have colorectal cancer. In this experiment, three patients (male), aged 57±6 years, with colorectal cancer were studied. To each patient was administered a water composition of the invention having the following constitution:

| Reagent | Amount |
|---|---|
| $Mg^{2+}$ ($MgCl_2$) | 140.0 mg/l |
| $Na^+$ ($NaHCO_3$) | 0.10 mg/l |
| Distilled water | Balance |

The composition (200 mL) was administered to each patient three times a day for one week. Fecal samples were collected as described in Example 2. The data from this experiment is shown in Table 2.

TABLE 2

DNase Activity in Colorectal Cancer Patients.

| Patient | DNase activity Before | One week later |
|---|---|---|
| 1 | ND* | 0.125 |
| 2 | ND | 0.150 |
| 3 | ND | 0.120 |

*ND = not detected

Example 4

This example describes a method for determining DNase activity in patients that have metabolic syndrome. Two groups of three patients (male), aged 68±5 years, with metabolic syndrome were studied. The patients in the study were overweight by 29.0±6.0 kg. To each patient was administered a water composition of the invention having the following constitution:

| Reagent | Amount (Group 1) | Amount (Group 2) |
|---|---|---|
| $Mg^{2+}$ ($MgCl_2$) | 140.0 mg/l | 8.0 mg/l |
| $Na^+$ ($NaHCO_3$) | 0.50 mg/l | 0.5 mg/l |
| Distilled water | Balance | Balance |

The composition (200 mL) was administered to each patient three times a day for a period of four weeks. Fecal samples were collected as described in Example 2. The data from this experiment is shown in Table 3.

TABLE 3

DNase Activity in Patients with Metabolic Syndrome.

| Patient | DNase activity Before | 4 weeks later | Weight (Kg) Before | 4 weeks later | Uric acid level (mg/dL) Before | 4 weeks later |
|---|---|---|---|---|---|---|
| Group 1 | | | | | | |
| 1 | 0120 | 0.250 | 82.0 | 79.5 | 8.2 | 7.5 |
| 2 | 0.115 | 0.190 | 97.0 | 94.0 | 8.62 | 7.85 |
| 3 | 0.220 | 0.280 | 102.0 | 99.0 | 7.85 | 6.10 |
| Group 2 | | | | | | |
| 4 | 0.110 | 0.150 | 98.0 | 95.0 | 9.0 | 8.2 |
| 5 | 0.200 | 0.240 | 114.0 | 110.0 | 8.7 | 6.93 |
| 6 | ND* | 0.200 | 96.0 | 93.5 | 7.9 | 6.3 |

*ND = not detected

These data indicate that in patients with metabolic syndrome, the composition of the invention is capable of causing an increase in DNase activity in feces, a decrease level of serum uric acid and a decrease in body weight after an administration period of one month.

The invention claimed is:

1. A product for maintenance of DNase activity, the product comprising (i) cations that consist of $Mg^{2+}$ and $Na^+$ cations, (ii) water, and (iii) succinic acid, wherein the product comprises about 100.0 mg/l $Mg^{2+}$ to about 140.0 mg/l $Mg^{2+}$ and about 0.1 mg/l $Na^+$ to about 2.0 mg/l $Na^+$, and wherein the product provides an increase in DNase activity when a DNase enzyme is in contact with the product.

2. The product of claim 1, further comprising an additive selected from the group consisting of: ascorbic acid; B vitamins; extracts or infusions of green tea; aloe; garcinia; gentiana; corn silk; turmeric; grapefruit; and citric acid.

3. The product of claim 1, wherein the source of $Na^+$ is sodium bicarbonate or sodium sulfate, and wherein the source of $Mg^{2+}$ is magnesium chloride or magnesium oxide, and/or succinic acid is added.

4. The product of claim 1, comprising about 6.0 to 15.0 mg/l $Mg^{2+}$.

5. The product of claim 1, wherein said composition is at room temperature.

6. The product of claim 1, wherein the water is selected from demineralized water or distilled water.

* * * * *